(12) United States Patent
Thompson

(10) Patent No.: US 7,534,965 B1
(45) Date of Patent: May 19, 2009

(54) CABLE GROMMET WITH BALL AND SOCKET

(76) Inventor: David M. Thompson, 802 Mantoloking Rd., Bricktown, NJ (US) 08723

( * ) Notice: Subject to any disclaimer, the term of this patent is extended or adjusted under 35 U.S.C. 154(b) by 0 days.

(21) Appl. No.: 12/011,676

(22) Filed: Jan. 29, 2008

(51) Int. Cl.
*H02G 3/22* (2006.01)

(52) U.S. Cl. .............................. 174/153 G; 174/152 G; 174/650; 174/72 A; 16/2.1; 16/2.2; 248/56

(58) Field of Classification Search .................. 174/650, 174/135, 152 R, 153 G, 152 G, 72 A, 652, 174/659; 16/2.1, 2.2; 248/56, 49; 277/314, 277/312, 330, 590, 602; 439/604, 587; 74/502.4, 74/502.6; 384/206, 208, 209, 212
See application file for complete search history.

(56) References Cited

U.S. PATENT DOCUMENTS

| | | | |
|---|---|---|---|
| 169,383 A | 11/1875 | Starr | |
| 1,672,605 A | 6/1928 | Dobrick | |
| 3,244,802 A * | 4/1966 | Sturtevant et al. | ....... 174/153 G |
| 5,109,321 A | 4/1992 | Maglica | |
| 5,704,255 A | 1/1998 | Graham | |
| 5,803,642 A | 9/1998 | Sassmannshausen | |
| 5,943,713 A | 8/1999 | Paterson | |
| 6,070,835 A | 6/2000 | Stillinger | |
| 6,500,170 B2 | 12/2002 | Palmer | |
| 6,627,817 B1 * | 9/2003 | Kortenbach | .................. 174/655 |
| 6,830,225 B2 * | 12/2004 | Kato | ........................... 248/49 |
| 7,005,579 B2 * | 2/2006 | Beele | ...................... 174/153 G |
| 7,111,798 B2 | 9/2006 | Thomas et al. | |
| 7,118,574 B2 | 10/2006 | Patel | |
| 7,258,504 B2 | 8/2007 | Griffin | |
| 7,339,119 B2 * | 3/2008 | Hamazu et al. | .............. 174/650 |
| 7,442,884 B2 * | 10/2008 | Ball et al. | .................... 174/650 |

* cited by examiner

*Primary Examiner*—Angel R Estrada
(74) *Attorney, Agent, or Firm*—Andrew W. Ludy

(57) ABSTRACT

A cable grommet with ball and socket is used in connection with an elongated member passing through a hole in a panel. The ball has a pair of opposed hemispherical members juxtaposed along a ball central axis and horizontal plane. The ball has a hole through it aligned with the central axis, to receive the elongated member. A socket supports and retains the ball securely, while allowing the ball to pivot in any direction. The socket has a pair of opposed cup members, each with a hemispherical cavity therein centered on a socket central axis and vertical plane. A pilot aligns the socket with the panel hole. The cup members each have two tabs projecting transversely from a semicircular flange. The tabs of the opposed cup members overlap. Each cup member has an upper and lower thickened brow portion on the cavity adjacent the flange ends to strengthen the cavity. An adapter allows mounting the grommet in an oversized panel hole.

12 Claims, 8 Drawing Sheets

CABLE GROMMET WITH BALL AND SOCKET

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention relates to the field of grommets, and more particularly to a cable grommet having a ball and socket joint.

Grommets are used to support and guide an elongated member through a hole in a panel. The elongated member can be a hose, an electrical cable or wire, a mechanical push-pull cable, a rigid rod, a fiber-optic cable, or any elongated object. The elongated member can be clamped firmly in place, or allowed to slide through the grommet. The ball can be clamped to maintain a fixed angle of penetration of the elongated member through the panel. Alternatively, the ball can be allowed to rotate within the socket, so that as the cable flexes, the ball will rotate to follow the changing angle of penetration. This is the case in some marine steering systems, where a cable angle will change to follow an outboard motor turning. It occurs also in shifting cables attached to a bell crank on a transmission housing.

Another consideration is to allow installation of the grommet over a cable that is already installed in the panel, without having to disconnect either end of the cable.

A further consideration is that the cable grommet for marine use should be water resistant. Rain and splashing water from a following sea should not penetrate the panel.

Cable grommets having a ball and socket mounting are known, and have taken a variety of configurations in the past. Some examples are shown in the following patents:

Stillinger, U.S. Pat. No. 6,070,835; shows a ball compression grommet for mounting a wire, cable, hose, or similar elongated member through a wall or panel. A spherical ball is formed in two hemispherical halves. A passage is formed through the center to accommodate the cable. The ball is held by a socket assembly comprising an outer nut with a spheroidal bore and internal threads. A threaded sleeve has a spheroidal bore, and is threaded into the outer nut, holding the ball. An inner nut attaches the assembly to the panel. As the nuts are tightened, they will clamp the ball tightly, preventing the ball from rotating to follow the angle of the elongated member. Both nuts and the sleeve must be installed from the free end of the cable. They cannot be installed without disconnecting one end of the cable.

Maglica, U.S. Pat. No. 5,109,321; depicts a slotted spherical ball clamped between split hemispherical socket members. The socket is split to install over the ball. The ball cannot be separated, and must be installed slidingly from the end of the elongated member. However, the socket is not split perpendicular to the elongated member. It is not designed to be mounted on a panel, with one half inside and one half outside the panel. The socket of Maglica 321 could not be assembled to either side of a panel, and assembled on the cable simultaneously. Furthermore, the screw fastener that clamps Maglica 321 to a tube also clamps the socket around the ball. The ball is not free to rotate to follow the changing angle of the elongated member. The assembly is not water resistant.

Accordingly, there is a need to provide a cable grommet having a ball and socket joint that can be assembled to either side of a panel, and assembled on the cable simultaneously, without disconnecting one end of the cable.

There is a further need to provide a cable grommet having a ball and socket joint of the type described and that can be installed securely on the panel, will grip the cable securely, and yet will allow the ball to rotate freely to follow the changing angle of penetration of the cable through the panel.

There is a yet further need to provide a cable grommet having a ball and socket joint of the type described and that is ruggedly constructed for long service life.

There is a still further need to provide a cable grommet having a ball and socket joint of the type described and that can be installed by unskilled personnel with simple hand tools.

There is another need to provide a cable grommet having a ball and socket joint of the type described and that can be manufactured cost-effectively in large quantities of high quality.

BRIEF SUMMARY OF THE INVENTION

In accordance with the present, invention, there is provided a cable grommet with ball and socket for use in connection with a panel and an elongated member passing through a hole in the panel. The ball has a ball central axis, and a horizontal plane aligned with the ball central axis. The ball has a pair of opposed hemispherical members juxtaposed along the horizontal plane. The ball has at least one ball hole through it, aligned with the ball central axis, to receive the elongated member. The pair of hemispherical members each has at least one pin projecting outward through the horizontal plane. The opposed hemispherical member has at least one pin hole to receive the pin. This is to align the hemispherical members for assembly.

A socket is provided to support and retain the ball securely, while allowing the ball to pivot in any direction. The socket has a pair of opposed cup members, and a socket central axis. The cup members each have a hemispherical cavity therein centered on the socket central axis. Each cavity encloses approximately half of the ball. Each cavity has inner and outer surfaces. The socket has a vertical plane aligned with the socket central axis. This vertical plane defines the boundary at which the two cup members are juxtaposed upon assembly. The socket has a circular cylindrical pilot extending outward to the rear along the socket central axis. The pilot is configured as two semicircular portions split along the central axis. Each portion is integral with one of the cup members. The two semicircular portions join together at assembly to form the circular pilot, which is received in the panel hole, so as to align the socket with the panel hole.

The cup members each have an outer periphery and a semicircular flange extending around the outer periphery from a flange upper end at the vertical plane to a flange lower end at the vertical plane. Each flange lies in a plane perpendicular to the socket central axis. Each flange has a predetermined thickness. Each cup member has an upper tab and a lower tab projecting transversely through the vertical plane from the flange upper and lower ends respectively. Each tab has a thickness of generally half the flange predetermined thickness. The upper and lower tabs of each cup member are adapted to overlap the upper and lower tabs of the opposed cup member respectively. The overlapping tabs lie flush with the flanges on the front and rear, and link together the opposed cup members. Each cup member has an upper and lower brow portion on the cavity outer surface adjacent the flange upper and lower ends respectively. The brow portions increase the thickness of the hemispherical cavity adjacent the vertical plane, thereby strengthening the cavity. Each cup member has a plurality of mounting holes through the flanges and tabs for mounting the socket on the panel.

BRIEF DESCRIPTION OF THE SEVERAL VIEWS OF THE DRAWING

A more complete understanding of the present invention may be obtained from consideration of the following description in conjunction with the drawing, in which.

DETAILED DESCRIPTION OF THE INVENTION

Figure 1:
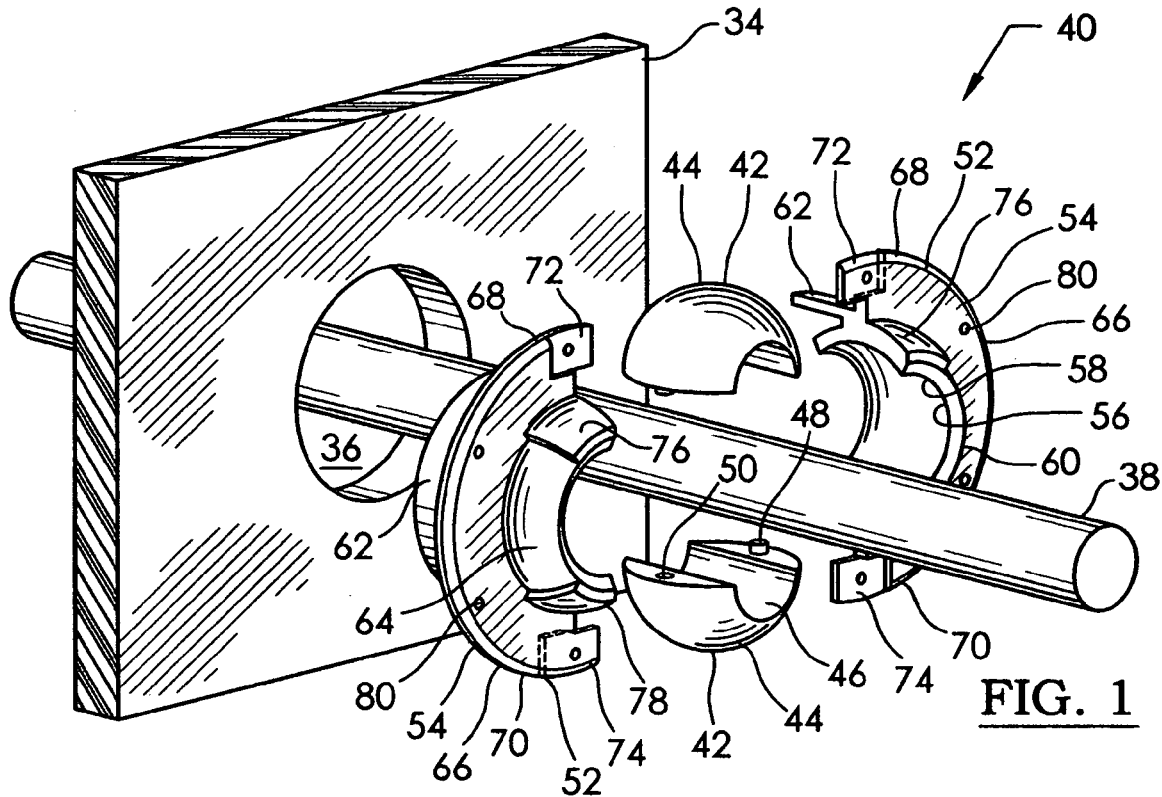
FIG. 1 is an exploded, perspective, assembly view of a cable grommet constructed in accordance with the invention, showing installation on a panel and elongated member.

Referring now to the drawing, and especially to FIGS. 1-8 thereof, a cable grommet with ball and socket is shown at 40, and is for use in connection with a wall, bulkhead, or panel 34, and a cable, or elongated member 38. The panel 34 has a hole 36 through it, and the elongated member 38 passes through the panel hole 36. The grommet 40 comprises a ball 42 having a pair of opposed hemispherical members 44. The ball 42 has a ball central axis, and a horizontal plane aligned with the ball central axis. The hemispherical members 44 are juxtaposed along the horizontal plane. The ball 42 has at least one ball hole 46 through it, and aligned with the ball central axis. The ball hole 46 is adapted to receive the elongated member 38. One, and preferably both, of the pair of hemispherical members 44 each has at least one pin 48 projecting outward through the horizontal plane. The opposed hemispherical member 44 has at least one pin hole 50 adapted to receive the pin 48. This is to align the hemispherical members 44 for assembly. Any number of pins may be employed.

A socket 52 is provided to support and retain the ball 42 securely, while allowing the ball 42 to pivot in any direction. The socket 52 has a pair of opposed cup members 54, which are identical. The socket 52 has a socket central axis. The cup members 54 each have a hemispherical cavity 56 therein centered on the socket central axis. Each cavity 56 encloses approximately half of the ball 42. Each cavity 56 has inner 58 and outer 60 surfaces. The socket 52 has a vertical plane aligned with the socket central axis. This vertical plane defines the boundary at which the two cup members 54 are juxtaposed upon assembly. The socket 52 has a circular cylindrical pilot 62 extending outward to the rear along the socket central axis. The pilot 62 is configured as two semicircular portions split along the central axis. Each portion is integral with one of the cup members 54. The two semicircular portions join together at assembly to form the circular pilot 62, which is received in the panel hole 36, so as to align the socket 52 with the panel hole 36.

The cup members 54 each have an outer periphery 64. The cup members 54 each have a semicircular flange 66 extending around the outer periphery 64 from a flange upper end 68 at the vertical plane to a flange lower end 70 at the vertical plane. Each flange 66 lies in a plane perpendicular to the socket central axis. Each flange 66 has a predetermined thickness. Each cup member 54 has an upper tab 72 and a lower tab 74 projecting transversely through the vertical plane from the flange upper 68 and lower 70 ends respectively. Each tab has a thickness of generally half the flange predetermined thickness. The upper 72 and lower 74 tabs of each cup member 54 are adapted to overlap the upper 72 and lower 74 tabs of the opposed cup member 54 respectively. The overlapping tabs 72 and 74 lie flush with the flanges 66 on the front and rear. The tabs 72 and 74 link together the opposed cup members 54. Each cup member 54 has an upper 76 and lower 78 brow portion on the cavity outer surface 60 adjacent the flange upper 68 and lower 70 ends respectively. The brow portions 76 and 78 increase the thickness of the hemispherical cavity 56 adjacent the vertical plane, thereby strengthening the cavity 56. Each cup member 54 has a plurality of mounting holes 80 through the flanges 66 and tabs 72 and 74 for mounting the socket 52 on the panel 34.

The grommet 40, including the ball 42 and the socket 52, is molded from a polymeric resin that can be either a thermoplastic resin or a thermoset resin.

Figure 2:
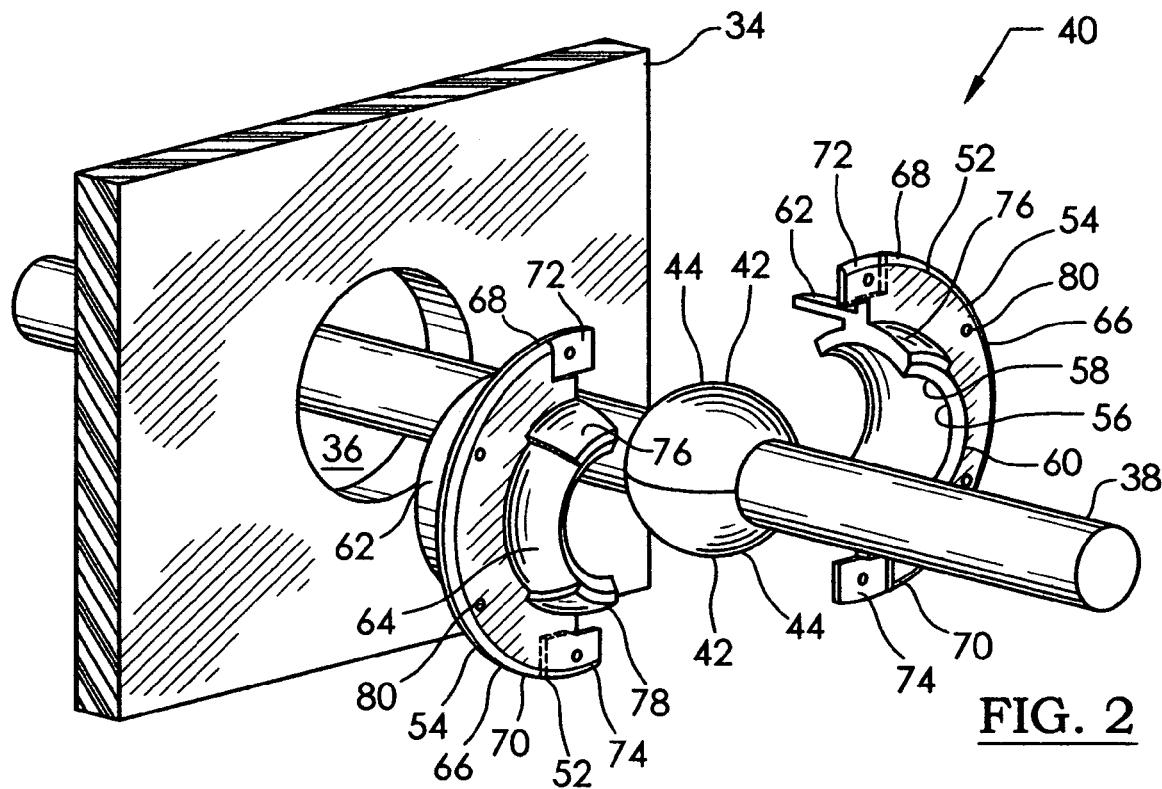
FIG. 2 is an exploded, perspective, assembly view of the cable grommet of FIG. 1, showing the ball hemispherical members assembled onto the elongated member.
Figure 3:
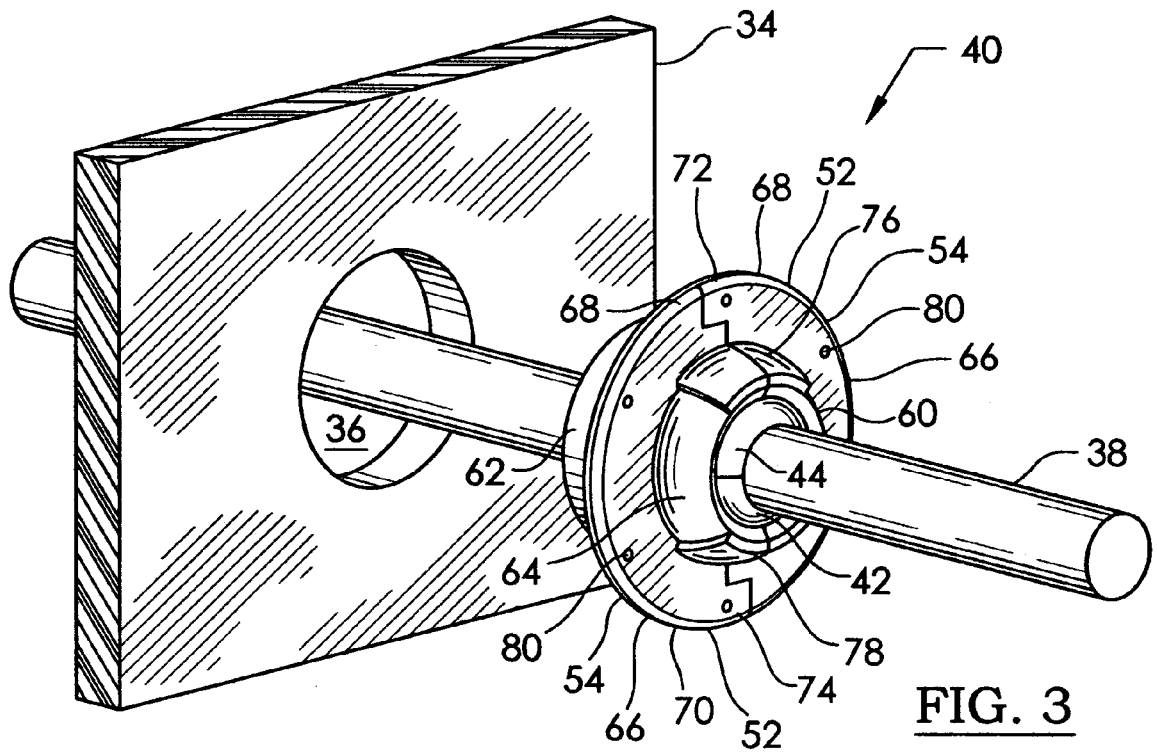
FIG. 3 is an exploded, perspective, assembly view of the cable grommet of FIG. 1, showing the socket cup members assembled onto the ball.
Figure 4:
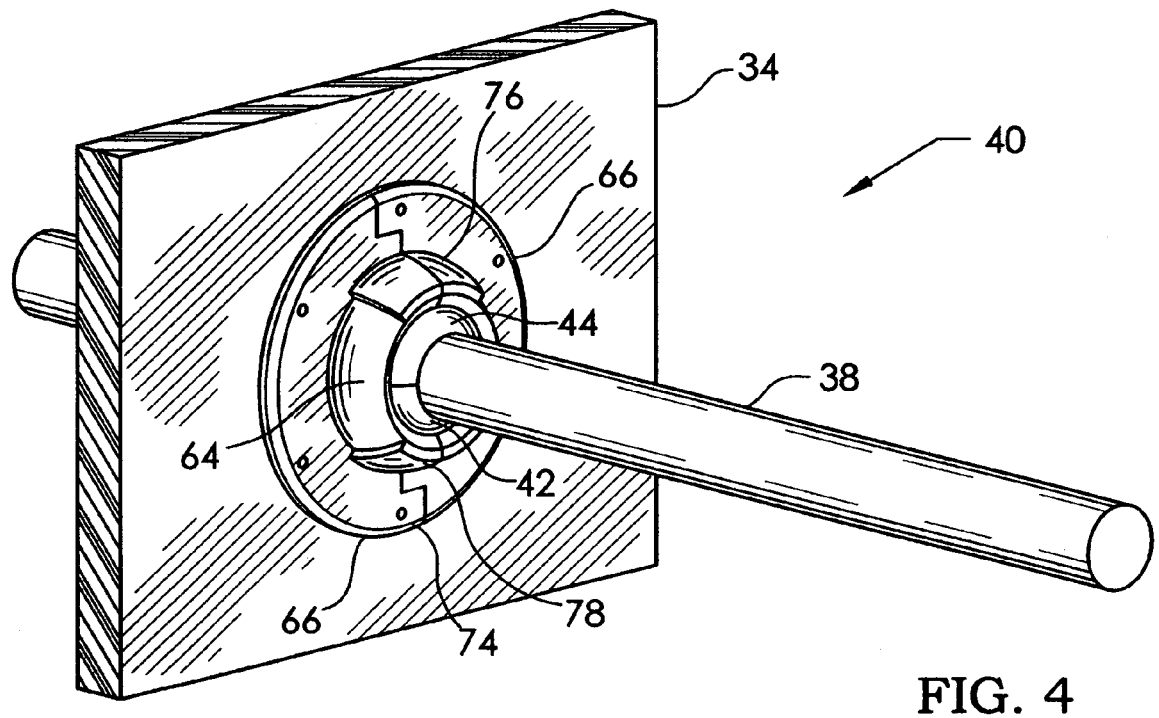
FIG. 4 is an exploded, perspective, assembly view of the cable grommet of FIG. 1, showing the grommet assembled onto the panel.

In order to assemble the grommet 40, the hemispherical members 44 are first brought together at the horizontal plane as in FIG. 2, sandwiching the elongated member 36 between the two hemispherical members 44. The pin 48 of each hemispherical member 44 engages the pin hole 50 of the opposite hemispherical member 44. The elongated member 36 is received in the ball hole 46. The cup members 54 are then brought together at the vertical plane as in FIG. 3, sandwiching the ball 42 between the cup members 54, as the ball 42 is received in each cavity 56. The tabs 72 and 74 will overlap. The grommet 40 is then disposed against the panel 34 as in FIG. 4, with the pilot 62 received in the panel hole 36. Fasteners, typically screws (not shown), are installed in the mounting holes 80. With the fasteners tightened, the ball 42 is still free to rotate within the socket 52 so as to allow angular movement of the elongated member 38.

Figure 9:
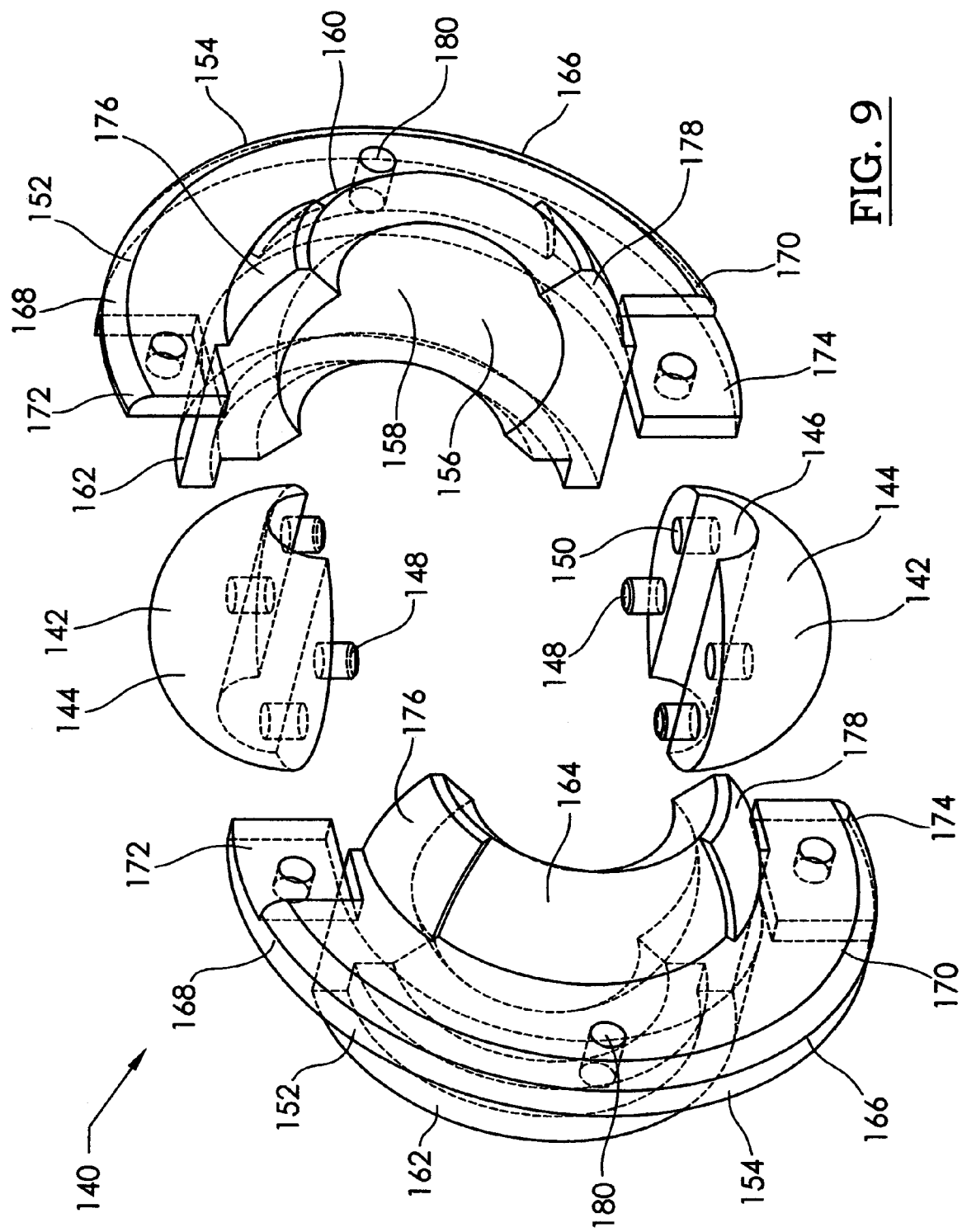
FIG. 9 is an exploded, perspective, assembly view of another cable grommet constructed in accordance with the invention.

Turning now to FIGS. 9-13, as well as FIGS. 1-12, another cable grommet with ball and socket is shown at 140, and is for use in connection with a wall, bulkhead, or panel 34, and a cable, or elongated member 38. Cable grommet 140 is similar to cable grommet 40 in that grommet 140 comprises a ball 142 having a pair of opposed hemispherical members 144. The ball 142 has a ball central axis, and a horizontal plane aligned with the ball central axis. The hemispherical members 144 are juxtaposed along the horizontal plane. The ball 142 has at least one ball hole 146 through it, and aligned with the ball central axis. The ball hole 146 is adapted to receive the elongated member 38. One, and preferably both, of the pair of hemispherical members 144 each has at least one pin 148 projecting outward through the horizontal plane. The opposed hemispherical member 144 has at least one pin hole 150 adapted to receive the pin 148. This is to align the hemispherical members 144 for assembly. Any number of pins may be employed, as shown in FIG. 9.

A socket 152 is provided to support and retain the ball 142 securely, while allowing the ball 142 to pivot in any direction. The socket 152 has a pair of opposed cup members 154, which are identical. The socket 152 has a socket central axis. The cup members 154 each have a hemispherical cavity 156 therein centered on the socket central axis. Each cavity 156 encloses approximately half of the ball 142. Each cavity 156 has inner 158 and outer 160 surfaces. The socket 152 has a vertical plane aligned with the socket central axis. This vertical plane defines the boundary at which the two cup members 154 are juxtaposed upon assembly. The socket 152 has a circular cylindrical pilot 162 extending outward to the rear along the socket central axis. The pilot 162 is configured as two semicircular portions split along the central axis. Each portion is integral with one of the cup members 154. The two semicircular portions join together at assembly to form the circular pilot 162, which is received in the panel hole 36, so as to align the socket 152 with the panel hole 36.

The cup members 154 each have an outer periphery 164. The cup members 154 each have a semicircular flange 166 extending around the outer periphery 164 from a flange upper end 168 at the vertical plane to a flange lower end 170 at the vertical plane. Each flange 166 lies in a plane perpendicular to the socket central axis. Each flange 166 has a predetermined thickness. Each cup member 154 has an upper tab 172 and a lower tab 174 projecting transversely through the vertical plane from the flange upper 168 and lower 170 ends respectively. Each tab has a thickness of generally half the flange predetermined thickness. The upper 172 and lower 174 tabs of each cup member 154 are adapted to overlap the upper 172 and lower 174 tabs of the opposed cup member 154 respectively. The overlapping tabs 172 and 174 lie flush with the flanges 166 on the front and rear. The tabs 172 and 174 link together the opposed cup members 154. Each cup member 154 has an upper 176 and lower 178 brow portion on the cavity outer surface 160 adjacent the flange upper 168 and lower 170 ends respectively. The brow portions 176 and 178 increase the thickness of the hemispherical cavity 156 adjacent the vertical plane, thereby strengthening the cavity 156. Each cup member 154 has a plurality of mounting holes 180 through the flanges 166 and tabs 172 and 174 for mounting the socket 152 on the panel 34.

Figure 5:
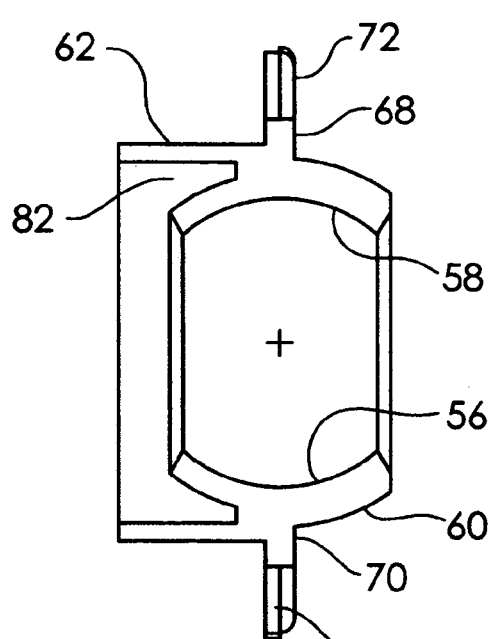
FIG. 5 is a left side elevational view of the cable grommet of FIG. 1.
Figure 6:
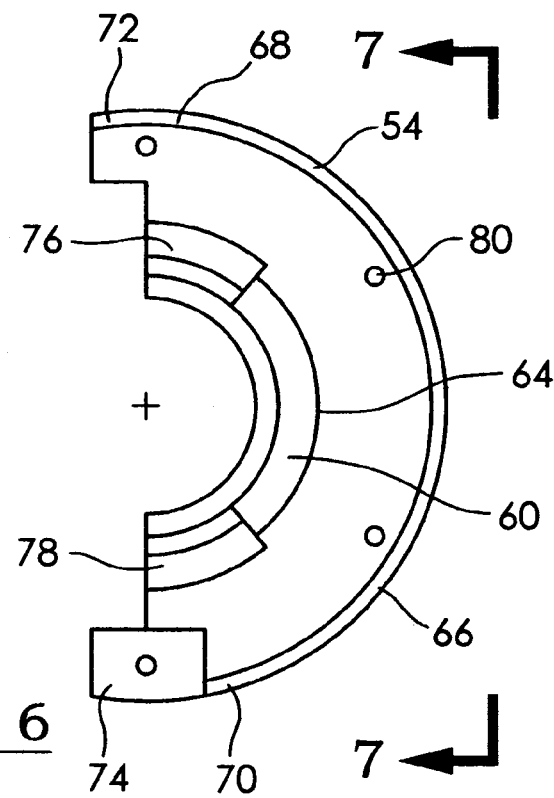
FIG. 6 is a front elevational view of the cable grommet of FIG. 1.
Figure 7:
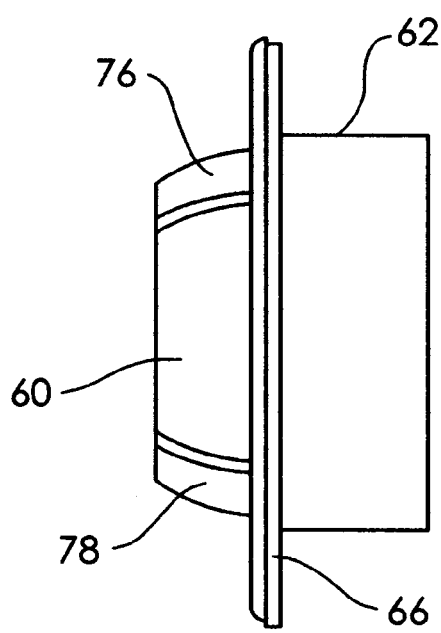
FIG. 7 is a right side elevational view of the cable grommet of FIG. 1, taken along lines 7-7 of FIG. 6.
Figure 8:
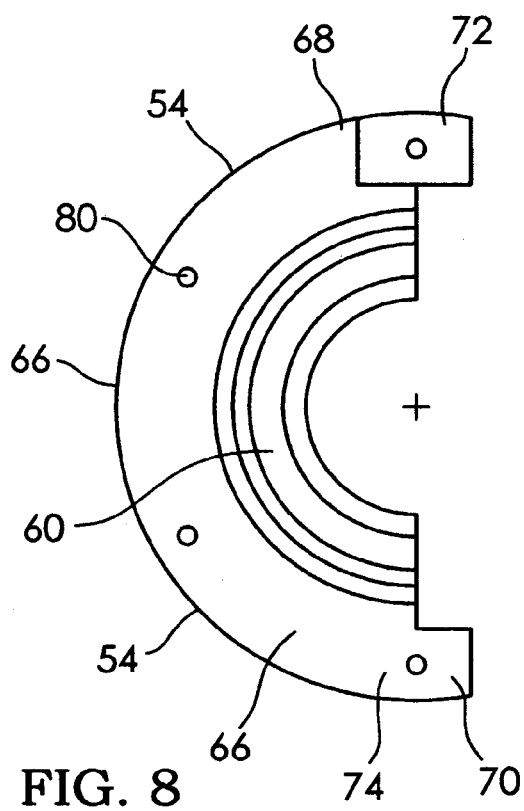
FIG. 8 is a rear elevational view of the cable grommet of FIG. 1.
Figure 10:
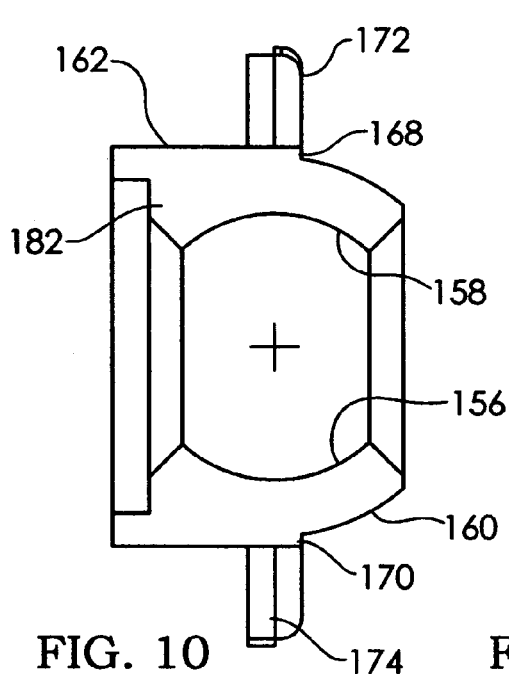
FIG. 10 is a left side elevational view of the cable grommet of FIG. 9.
Figure 11:
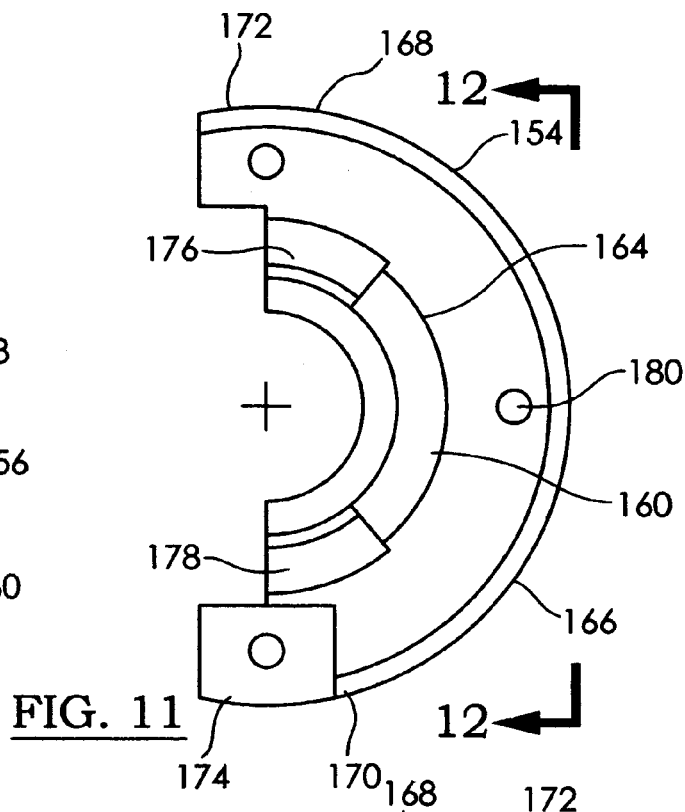
FIG. 11 is a front elevational view of the cable grommet of FIG. 9.
Figure 12:
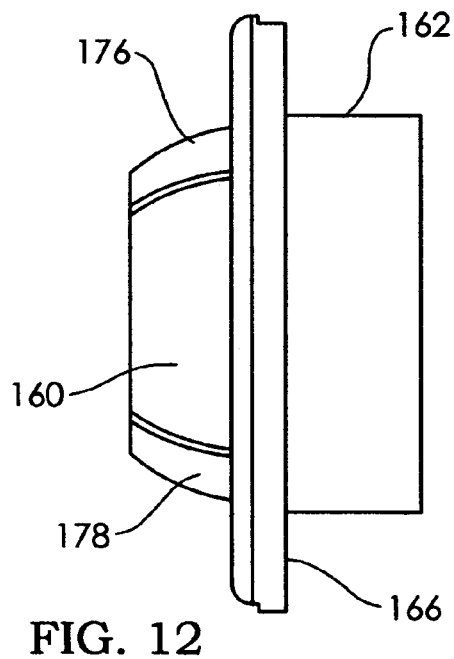
FIG. 12 is a right side elevational view of the cable grommet of FIG. 9, taken along lines 12-12 of FIG. 11.
Figure 13:
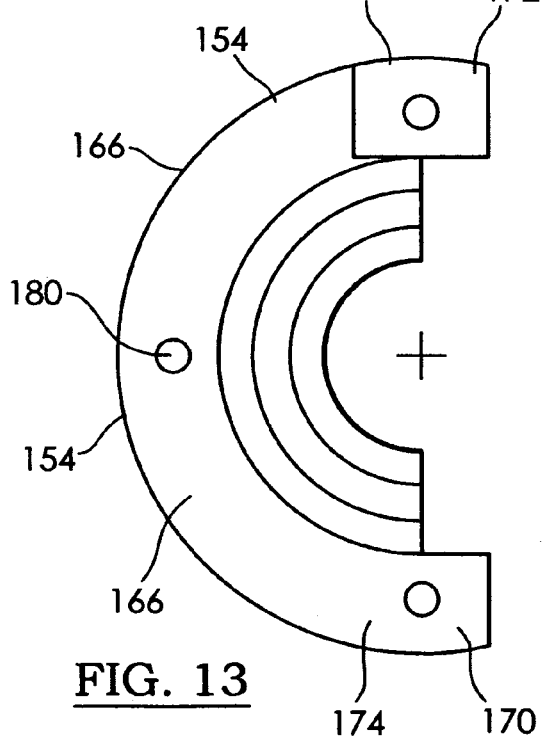
FIG. 13 is a rear elevational view of the cable grommet of FIG. 9.

Cable grommet 140 differs from cable grommet 40 in that the rear aspect 182 of the hemispherical cavity 156 is filled in solid between the outer surface 160 and the pilot 162, as shown in FIG. 10. This strengthens the cavity 156. In contrast, grommet 40 opens up the rear aspect 82, as shown in FIG. 5. This reduces the weight of the grommet 40.

Figure 14:
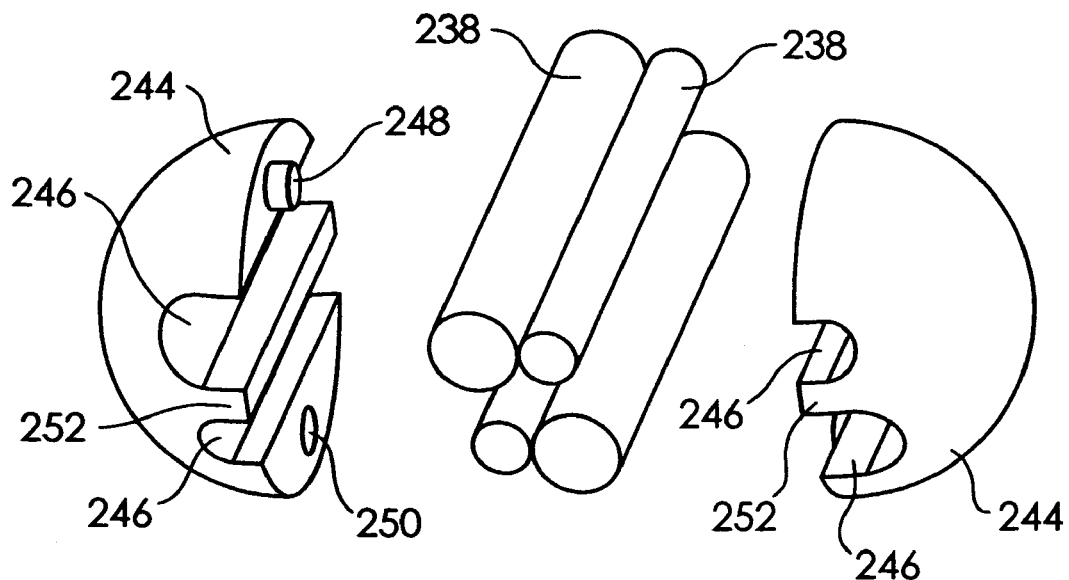
FIG. 14 is an exploded, perspective, assembly view of another ball used for the cable grommet constructed in accordance with the invention.
Figure 15:
FIG. 15 is a contracted, perspective, assembly view of the ball of FIG. 14.
Figure 16:
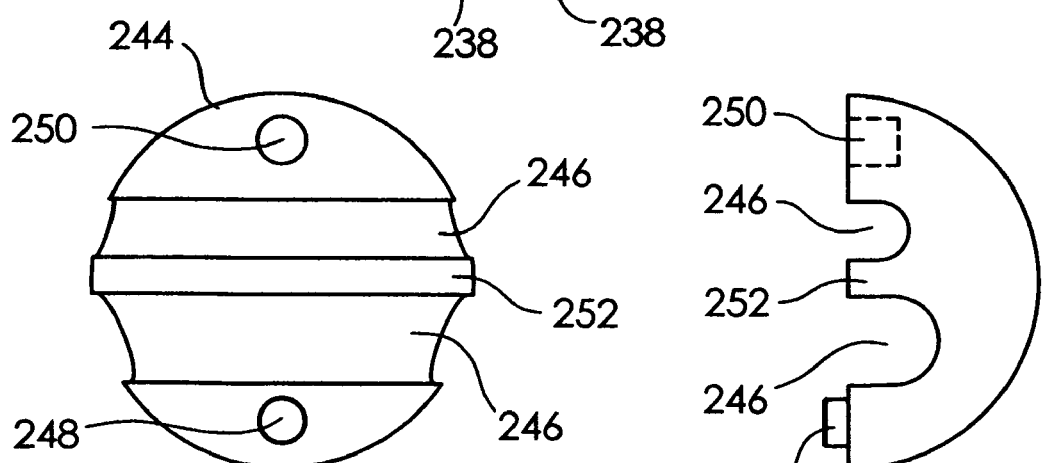
FIG. 16 is a top plan view of the ball of FIG. 14.
Figure 17:
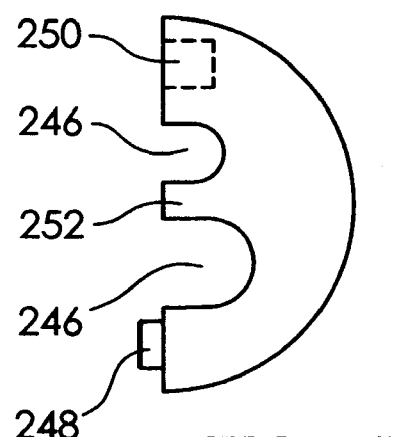
FIG. 17 is a right side elevational view of the ball of FIG. 14.

Referring now to FIGS. 14-17, another embodiment of the ball is shown at 242. Ball 242 is similar to ball 42 in that it has a pair of opposed hemispherical members 244. The ball 242 has a ball central axis, and a horizontal plane aligned with the ball central axis. The hemispherical members 244 are juxtaposed along the horizontal plane. The pair of hemispherical members 244 each has at least one pin 248 projecting outward through the horizontal plane. The opposed hemispherical member 244 has at least one pin hole 250 adapted to receive the pin 248. This is to align the hemispherical members 244 for assembly. The ball 242 differs from ball 42 in that it has two ball holes 246 through it, and aligned with the ball central axis. The ball holes 246 are adapted to receive several elongated members 238. The elongated members 238 can be the same size, or of different sizes, as shown in FIGS. 14 and 15. Any number of pins may be employed. The ball 242 has a central septum 252 to strengthen the ball 242 against crushing in the central region.

Figure 18:
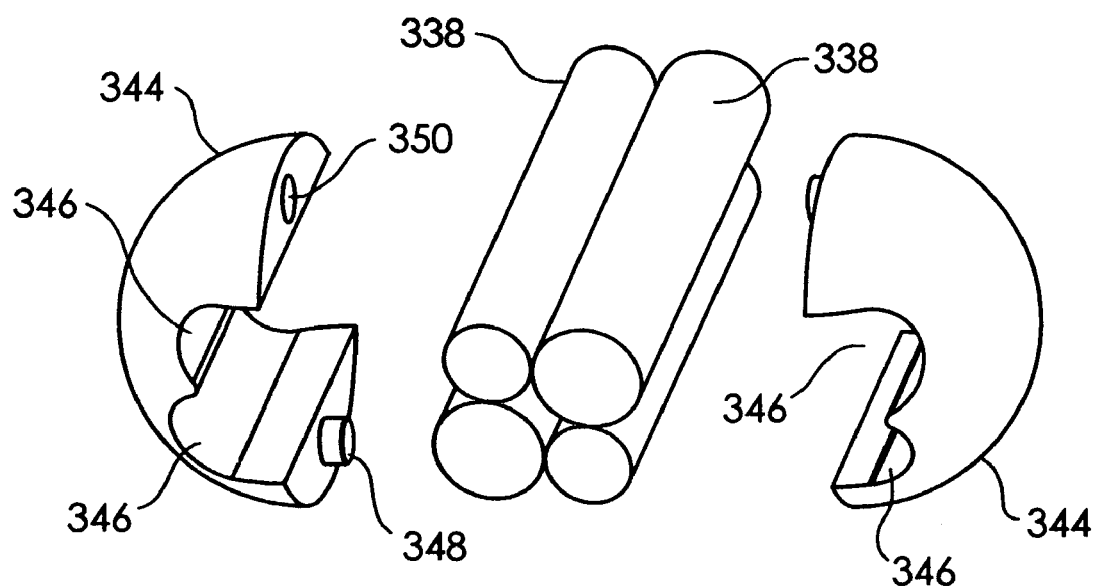
FIG. 18 is an exploded, perspective, assembly view of still another ball used for the cable grommet constructed in accordance with the invention.
Figure 19:
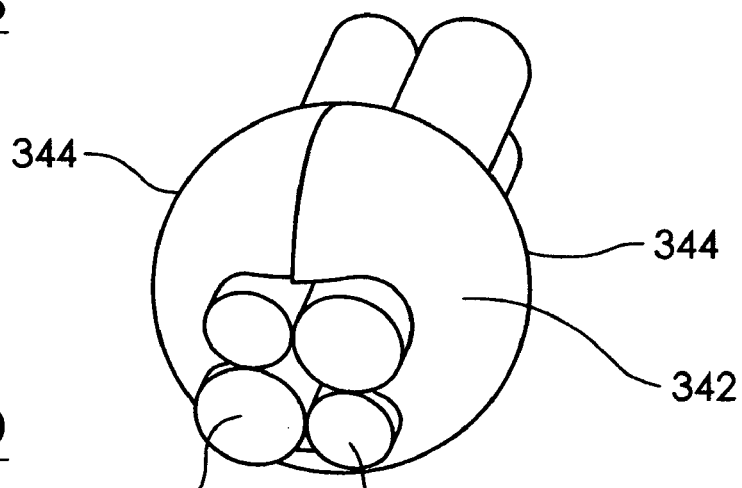
FIG. 19 is a contracted, perspective, assembly view of the ball of FIG. 18.
Figure 20:
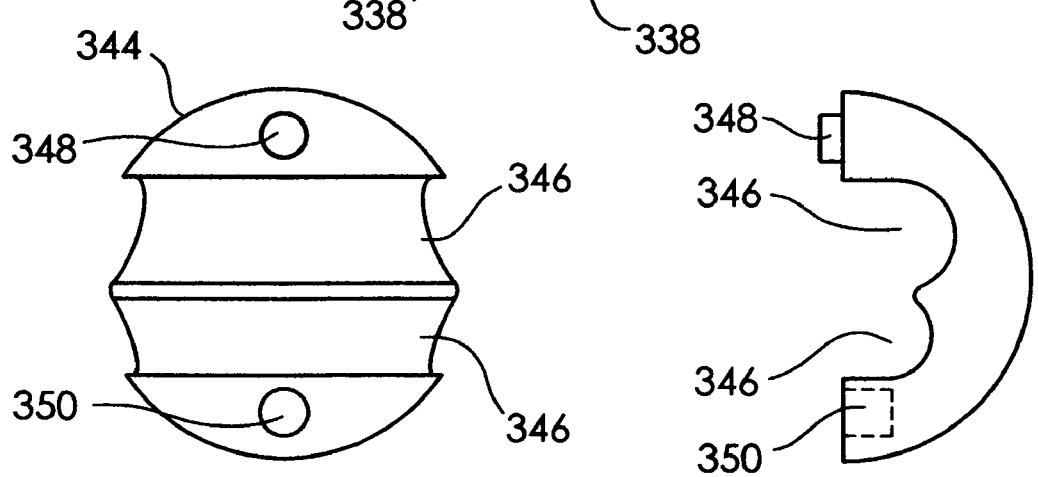
FIG. 20 is a top plan view of the ball of FIG. 18.
Figure 21:
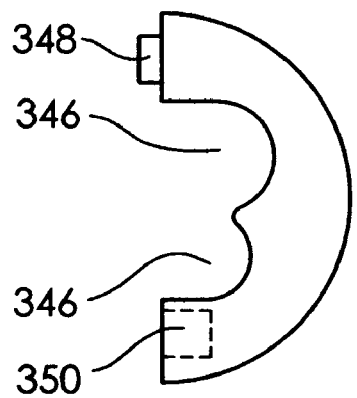
FIG. 21 is a right side elevational view of the ball of FIG. 18.

Referring now to FIGS. 18-21, yet another embodiment of the ball is shown at 342. Ball 342 is similar to ball 42 in that it has a pair of opposed hemispherical members 344. The ball 342 has a ball central axis, and a horizontal plane aligned with the ball central axis. The hemispherical members 344 are juxtaposed along the horizontal plane. The pair of hemispherical members 344 each has at least one pin 348 projecting outward through the horizontal plane. The opposed hemispherical member 344 has at least one pin hole 350 adapted to receive the pin 348. This is to align the hemispherical members 344 for assembly. The ball 342 differs from ball 42 in that it has two ball holes 346 through it, and aligned with the ball central axis. The ball holes 346 are adapted to receive several elongated members 338. The elongated members 338 can be the same size, or of different sizes, as shown in FIGS. 18 and 19. Any number of pins may be employed. The ball 342 differs from ball 242 in that it has no central septum. The elongated members 338 are closely nested to save weight and space.

Figure 22:
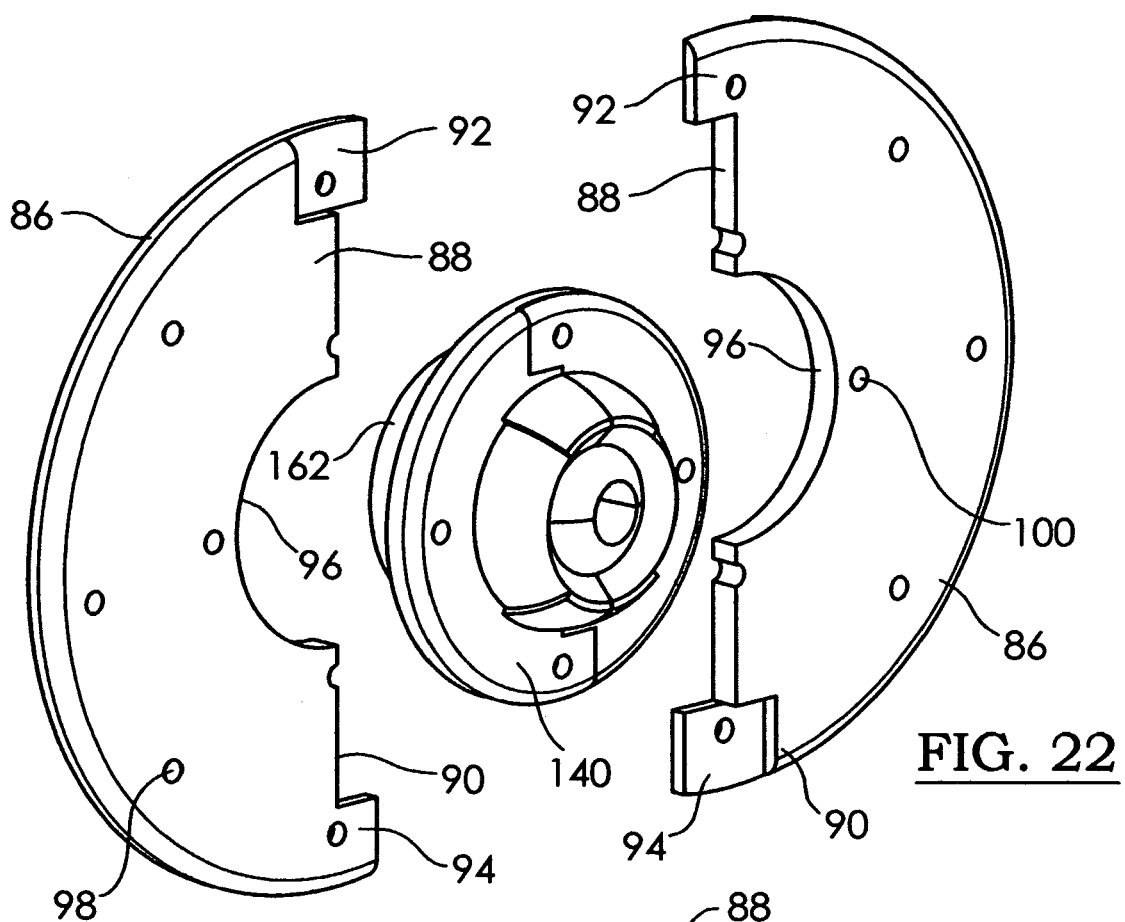
FIG. 22 is an exploded, perspective, assembly view of an adapter used with the cable grommet constructed in accordance with the invention.
Figure 23:
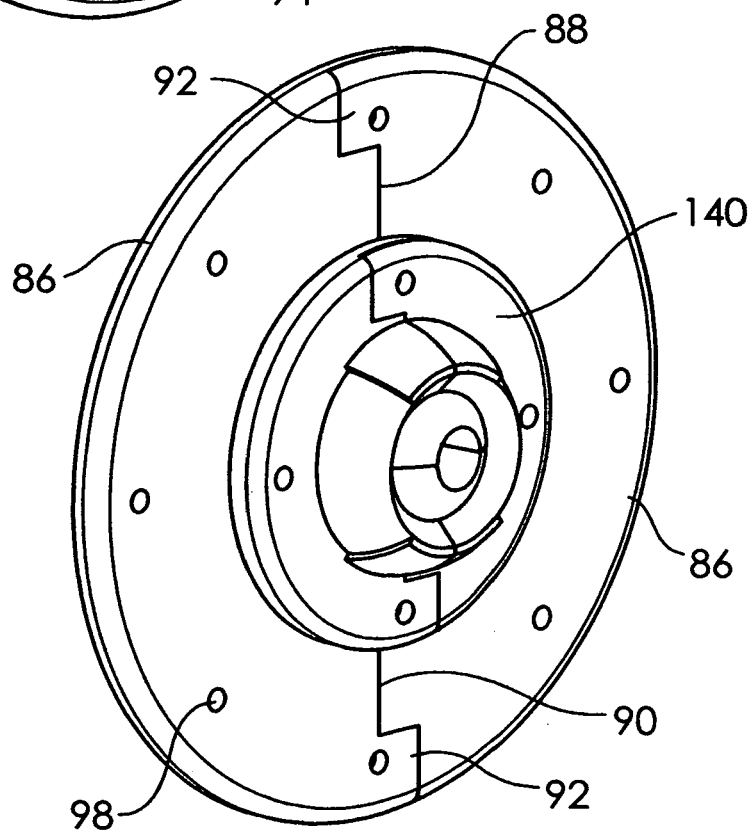
FIG. 23 is a contracted, perspective, assembly view of the adapter of FIG. 22, showing installation on a grommet.

Turning now to FIGS. 22 and 23, an adapter is shown at 84 for mounting the grommet 40 or 140 in a panel hole 36 larger than the grommet 40 or 140. The adapter 84 comprises a pair of opposed semicircular plates 86. The adapter 84 has an adapter central axis and a plate vertical plane aligned with the adapter central axis. The semicircular plates 86 are juxtaposed along the plate vertical plane. Each semicircular plate 86 lies in a plane perpendicular to the adapter central axis. Each semicircular plate 86 has a plate predetermined thickness. Each semicircular plate 86 extends in a semicircle from a plate upper end 88 at the plate vertical plane to a plate lower end 90 at the plate vertical plane. Each semicircular plate 86 has an upper plate tab 92 and a lower plate tab 94 projecting transversely through the plate vertical plane from the plate upper 88 and lower 90 ends respectively. Each plate tab 92 and 94 has a thickness of generally half the plate predetermined thickness. The upper 92 and lower 94 plate tabs of each semicircular plate 86 are adapted to overlap the upper 92 and lower 94 plate tabs of the opposed semicircular plate 86 respectively, so as to link together the opposed semicircular plates. The adapter 84 has a generally circular aperture 96 therein centered on the adapter central axis. The aperture 96 is adapted to receive the pilot 62 or 162. The adapter 84 has a plurality of mounting holes 98 for attaching the adapter 84 on the panel 34. The adapter 84 has a plurality of transfer holes 100 for attaching the adapter 84 on the grommet 40 or 140. Upon assembly, the semicircular plates 86 will be brought together at the plate vertical plane. The pilot 162 will be received in the aperture 96. The upper tabs 92 will overlap, and the lower tabs 94 will overlap. The adapter 84 will be disposed against the flanges 166, and the adapter 84 will be disposed against the panel 34. Installing fasteners (not shown) will mount the grommet 140 on the adapter 84 and mount the adapter 84 on the panel 34.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications that will come within the scope of the appended claims is reserved.

PARTS LIST
CABLE GROMMET WITH BALL AND SOCKET

| PART NO. | DESCRIPTION |
|---|---|
| 34 | panel |
| 36 | panel hole |
| 38 | elongated member |
| 40 | grommet |
| 42 | ball |
| 44 | hemispherical members |
| 46 | ball hole |
| 48 | pin |
| 50 | pin hole |
| 52 | socket |
| 54 | cup members |
| 56 | hemispherical cavity |
| 58 | cavity inner surface |
| 60 | cavity outer surface |
| 62 | pilot |
| 64 | outer periphery |
| 66 | flange |
| 68 | flange upper end |
| 70 | flange lower end |
| 72 | upper tabs |
| 74 | lower tabs |
| 76 | upper brow portion |
| 78 | lower brow portion |
| 80 | mounting holes |
| 82 | cavity rear aspect |
| 84 | adapter |
| 86 | semicircular plates |
| 88 | plate upper end |
| 90 | plate lower end |
| 92 | upper plate tab |
| 94 | lower plate tab |
| 96 | aperture |
| 98 | mounting holes |
| 100 | transfer holes |
| 140 | grommet |
| 142 | ball |
| 144 | hemispherical members |
| 146 | ball hole |
| 148 | pin |
| 150 | pin hole |
| 152 | socket |
| 154 | cup members |

-continued

PARTS LIST
CABLE GROMMET WITH BALL AND SOCKET

| PART NO. | DESCRIPTION |
|---|---|
| 156 | hemispherical cavity |
| 158 | cavity inner surface |
| 160 | cavity outer surface |
| 162 | pilot |
| 164 | outer periphery |
| 166 | flange |
| 168 | flange upper end |
| 170 | flange lower end |
| 172 | upper tabs |
| 174 | lower tabs |
| 176 | upper brow portion |
| 178 | lower brow portion |
| 180 | mounting holes |
| 182 | cavity rear aspect |
| 238 | elongated members |
| 242 | ball |
| 244 | hemispherical members |
| 246 | ball holes |
| 248 | pin |
| 250 | pin hole |
| 252 | septum |
| 338 | elongated members |
| 342 | ball |
| 344 | hemispherical members |
| 346 | ball holes |
| 348 | pin |
| 350 | pin hole |

The embodiments of the invention in which an exclusive property or privilege is claimed are defined as follows:

1. A grommet for use in connection with a panel and an elongated member, the panel having a hole therethrough, the elongated member passing through the panel hole, the grommet comprising:

a ball having a pair of opposed hemispherical members, the ball having a ball central axis, the ball having a horizontal plane aligned with the ball central axis, the hemispherical members being juxtaposed along the horizontal plane, the ball having at least one ball hole therethrough aligned with the ball central axis, the ball hole being adapted to receive the elongated member; and a socket having a pair of opposed cup members, the socket having a socket central axis, the cup members each having a hemispherical cavity therein centered on the socket central axis, each cavity having inner and outer surfaces, the socket having a vertical plane aligned with the socket central axis, the cup members being juxtaposed along the vertical plane, the socket having a cylindrical pilot extending outward along the socket central axis, the pilot being adapted to be received in the panel hole, so as to align the socket with the panel hole, the cup members each having an outer periphery, the cup members each having a semicircular flange extending around the outer periphery from a flange upper end at the vertical plane to a flange lower end at the vertical plane, each flange lying in a plane perpendicular to the socket central axis, each flange having a predetermined thickness, each cup member having an upper tab and a lower tab projecting transversely through the vertical plane from the flange upper and lower ends respectively, each tab having a thickness of generally half the flange predetermined thickness, the upper and lower tabs of each cup member being adapted to overlap the upper and lower tabs of the opposed cup member respectively, so as to link together the opposed cup members, each cup member having a plurality of mounting holes through the flanges and tabs for mounting the socket on the panel;

so that the hemispherical members will be brought together at the horizontal plane, the elongated member will be received in the ball hole, the cup members will be brought together at the vertical plane, the ball will be received in each cavity, the tabs will overlap, the grommet will be disposed against the panel with the pilot received in the panel hole, and the ball will be free to rotate within the socket so as to allow angular movement of the elongated member.

2. The grommet of claim 1, wherein each cup member further comprises an upper and lower brow portion on the cavity outer surface adjacent the flange upper and lower ends respectively, so as to reinforce the cavity adjacent the vertical plane.

3. The grommet of claim 1, wherein one of the pair of hemispherical members has at least one pin projecting outward through the horizontal plane, and the opposed hemispherical member has at least one hole adapted to receive the pin, so as to align the hemispherical members for assembly.

4. The grommet of claim 3, wherein at least one of the pair of hemispherical members has two ball holes therethrough aligned with the ball central axis adapted to receive at least two elongated members.

5. The grommet of claim 1, further comprising an adapter for mounting the grommet in a panel hole larger than the grommet, the adapter comprising:

a pair of opposed semicircular plates, the adapter having an adapter central axis, the adapter having a plate vertical plane aligned with the adapter central axis, the semicircular plates being juxtaposed along the plate vertical plane, each semicircular plate lying in a plane perpendicular to the adapter central axis, each semicircular plate having a plate predetermined thickness, each semicircular plate extending in a semicircle from a plate upper end at the plate vertical plane to a plate lower end at the plate vertical plane, each semicircular plate having an upper plate tab and a lower plate tab projecting transversely through the plate vertical plane from the plate upper and lower ends respectively, each plate tab having a thickness of generally half the plate predetermined thickness, the upper and lower plate tabs of each semicircular plate being adapted to overlap the upper and lower plate tabs of the opposed semicircular plate respectively, so as to link together the opposed semicircular plates, the adapter having a generally circular aperture therein centered on the adapter central axis, the aperture being adapted to receive the pilot;

so that the semicircular plates will be brought together at the plate vertical plane, the pilot will be received in the aperture, the tabs will overlap, the adapter will be disposed against the flanges, and the adapter will be disposed against the panel, thereby mounting the grommet on the panel.

6. The grommet of claim 5, wherein the grommet is molded from a polymeric resin selected from the group consisting of thermoplastic resins and thermoset resins.

7. A grommet for use in connection with a panel and an elongated member, the panel having a hole therethrough, the elongated member passing through the panel hole, the grommet comprising:

a ball having a pair of opposed hemispherical members, the ball having a ball central axis, the ball having a horizontal plane aligned with the ball central axis, the hemispherical members being juxtaposed along the horizontal plane, the ball having at least one ball hole therethrough aligned with the ball central axis, the ball hole being adapted to receive the elongated member; and a socket having a pair of opposed cup members, the socket having a socket central axis, the cup members each having a hemispherical cavity therein centered on the socket central axis, each cavity having inner and outer surfaces, the socket having a vertical plane aligned with the socket central axis, the cup members being juxtaposed along the vertical plane, the socket having a cylindrical pilot extending outward along the socket central axis, the pilot being adapted to be received in the panel hole, so as to align the socket with the panel hole, the cup members each having an outer periphery, the cup members each having a semicircular flange extending around the outer periphery from a flange upper end at the vertical plane to a flange lower end at the vertical plane, each flange lying in a plane perpendicular to the socket central axis, each flange having a predetermined thickness, each cup member having an upper tab and a lower tab projecting transversely through the vertical plane from the flange upper and lower ends respectively, each tab having a thickness of generally half the flange predetermined thickness, the upper and lower tabs of each cup member being adapted to overlap the upper and lower tabs of the opposed cup member respectively, so as to link together the opposed cup members, each cup member having an upper and lower brow portion on the cavity outer surface adjacent the flange upper and lower ends respectively, so as to reinforce the cavity adjacent the vertical plane, each cup member having a plurality of mounting holes through the flanges and tabs for mounting the socket on the panel;

so that the hemispherical members will be brought together at the horizontal plane, the elongated member will be received in the ball hole, the cup members will be brought together at the vertical plane, the ball will be received in each cavity, the tabs will overlap, the grommet will be disposed against the panel with the pilot received in the panel hole, and the ball will be free to rotate within the socket so as to allow angular movement of the elongated member.

8. The grommet of claim 7, wherein one of the pair of hemispherical members has at least one pin projecting outward through the horizontal plane, and the opposed hemispherical member has at least one hole adapted to receive the pin, so as to align the hemispherical members for assembly.

9. The grommet of claim 8, wherein at least one of the pair of hemispherical members has two ball holes therethrough aligned with the ball central axis adapted to receive at least two elongated members.

10. The grommet of claim 7, further comprising an adapter for mounting the grommet in a panel hole larger than the grommet, the adapter comprising:

a pair of opposed semicircular plates, the adapter having an adapter central axis, the adapter having a plate vertical plane aligned with the adapter central axis, the semicircular plates being juxtaposed along the plate vertical plane, each semicircular plate lying in a plane perpendicular to the adapter central axis, each semicircular plate having a plate predetermined thickness, each semicircular plate extending in a semicircle from a plate upper end at the plate vertical plane to a plate lower end at the plate vertical plane, each semicircular plate having an upper plate tab and a lower plate tab projecting transversely through the plate vertical plane from the plate upper and lower ends respectively, each plate tab having a thickness of generally half the plate predetermined thickness, the upper and lower plate tabs of each semicircular plate being adapted to overlap the upper and lower plate tabs of the opposed semicircular plate respectively, so as to link together the opposed semicircular plates, the adapter having a generally circular aperture therein centered on the adapter central axis, the aperture being adapted to receive the pilot;

so that the semicircular plates will be brought together at the plate vertical plane, the pilot will be received in the aperture, the tabs will overlap, the adapter will be disposed against the flanges, and the adapter will be disposed against the panel, thereby mounting the grommet on the panel.

11. A grommet for use in connection with a panel and an elongated member, the panel having a hole therethrough, the elongated member passing through the panel hole, the grommet comprising:

a ball having a pair of opposed hemispherical members, the ball having a ball central axis, the ball having a horizontal plane aligned with the ball central axis, the hemispherical members being juxtaposed along the horizontal plane, the ball having at least one ball hole therethrough aligned with the ball central axis, the ball hole being adapted to receive the elongated member, one of the pair of hemispherical members having at least one pin projecting outward through the horizontal plane, the opposed hemispherical member having at least one hole adapted to receive the pin, so as to align the hemispherical members for assembly; and a socket having a pair of opposed cup members, the socket having a socket central axis, the cup members each having a hemispherical cavity therein centered on the socket central axis, each cavity having inner and outer surfaces, the socket having a vertical plane aligned with the socket central axis, the cup members being juxtaposed along the vertical plane, the socket having a cylindrical pilot extending outward along the socket central axis, the pilot being adapted to be received in the panel hole, so as to align the socket with the panel hole, the cup members each having an outer periphery, the cup members each having a semicircular flange extending around the outer periphery from a flange upper end at the vertical plane to a flange lower end at the vertical plane, each flange lying in a plane perpendicular to the socket central axis, each flange having a predetermined thickness, each cup member having an upper tab and a lower tab projecting transversely through the vertical plane from the flange upper and lower ends respectively, each tab having a thickness of generally half the flange predetermined thickness, the upper and lower tabs of each cup member being adapted to overlap the upper and lower tabs of the opposed cup member respectively, so as to link together the opposed cup members, each cup member having an upper and lower brow portion on the cavity outer surface adjacent the flange upper and lower ends respectively, so as to reinforce the cavity adjacent the vertical plane, each cup member having a plurality of mounting holes through the flanges and tabs for mounting the socket on the panel;

so that the hemispherical members will be brought together at the horizontal plane, the elongated member will be received in the ball hole, the cup members will be brought together at the vertical plane, the ball will be received in each cavity, the tabs will overlap, the grommet will be disposed against the panel with the pilot received in the panel hole, and the ball will be free to rotate within the socket so as to allow angular movement of the elongated member.

12. The grommet of claim 11, wherein the grommet is molded from a polymeric resin selected from the group consisting of thermoplastic resins and thermoset resins.

* * * * *